(12) United States Patent
Has et al.

(10) Patent No.: US 9,898,232 B2
(45) Date of Patent: Feb. 20, 2018

(54) METHOD AND DEVICE FOR SEQUENCING PRINT JOBS

(71) Applicant: Oce Printing Systems GmbH & Co. KG, Poing (DE)

(72) Inventors: Michael Has, Erding (DE); Joerg Schmidt, Munich (DE); Albin Stoderschnig, Munich (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 15/133,462

(22) Filed: Apr. 20, 2016

(65) Prior Publication Data

US 2016/0306595 A1    Oct. 20, 2016

(30) Foreign Application Priority Data

Apr. 20, 2015  (DE) .................. 10 2015 105 984
Oct. 23, 2015  (DE) .................. 10 2015 118 139

(51) Int. Cl.
*G06F 3/12*    (2006.01)
*G06K 15/02*   (2006.01)
*H04N 1/50*    (2006.01)

(52) U.S. Cl.
CPC .......... *G06F 3/1217* (2013.01); *G06F 3/1262* (2013.01); *G06F 3/1282* (2013.01); *G06K 15/022* (2013.01); *H04N 1/502* (2013.01)

(58) Field of Classification Search
CPC .. G06F 17/3028; G06F 3/1205; G06F 3/1242; G06F 3/048; G06F 3/0484; G06F 3/04842; G06F 3/04845; G06F 3/126; G06F 3/1204; G06F 17/243; G06F 3/1272; G06F 3/1287; G06F 17/211; G06F 3/12; G06F 3/1211
See application file for complete search history.

(56) References Cited

U.S. PATENT DOCUMENTS

| | | | | |
|---|---|---|---|---|
| 2008/0273221 | A1* | 11/2008 | Couchman | H04N 1/00209 358/1.15 |
| 2011/0206275 | A1* | 8/2011 | Takahashi | G06T 7/74 382/159 |
| 2011/0311287 | A1* | 12/2011 | Has | G06F 3/1204 400/76 |
| 2014/0180651 | A1* | 6/2014 | Lysak | G06Q 10/06 703/2 |
| 2016/0210087 | A1* | 7/2016 | Amir | G06F 3/1217 |

FOREIGN PATENT DOCUMENTS

DE   102009009540 A1   8/2010

* cited by examiner

*Primary Examiner* — Henok A Shiferaw
(74) *Attorney, Agent, or Firm* — Schiff Hardin LLP

(57) ABSTRACT

In a method to administer, via a print job administrator, print jobs to be printed at a printing system, a plurality of print jobs are determined. A print job can indicate a specification of one or more print features. Different specifications of a print feature may require different configurations of the printing system. Change-over expenditures for the printing of at least two print jobs of the plurality of print jobs by the printing system can be determined based on the specification of the one or more print features of the plurality of print jobs. An order for the printing of the plurality of print jobs can be determined based on the change-over expenditures. The order of the plurality of print jobs can be indicated.

10 Claims, 6 Drawing Sheets

METHOD AND DEVICE FOR SEQUENCING PRINT JOBS

CROSS REFERENCE TO RELATED APPLICATIONS

This patent application claims priority to German Patent Application No. 102015105984.3, filed on Apr. 20, 2015, and German Patent Application No. 102015118139.8, filed on Oct. 23, 2015, each of which is incorporated herein by reference in its entirety.

BACKGROUND

The disclosure is directed to methods and devices for administering print jobs, including methods and devices that associate print jobs with printing systems or production systems, and/or that establish the order of the processing of print jobs.

Typically, a plurality of different print jobs are executed with printing systems—in particular with high-capacity printing systems—in relatively short time periods. Such print jobs are often administered in a print job administrator (for example in an Output Management System (OMS)) to which are connected one or more printing systems.

Different print jobs for the most part have different requirements in order to be produced, for example with regard to print media to be used, with regard to printer settings, with regard to required print colors, with regard to necessary online post-processing systems and their settings etc. Given continuous printing systems, the setting of a printing system for a specific print job may in particular lead to a momentary standstill of the printing system if the requirements of the print job to be printed deviate from the requirements of a previously produced print job.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

DETAILED DESCRIPTION

Figure 1:
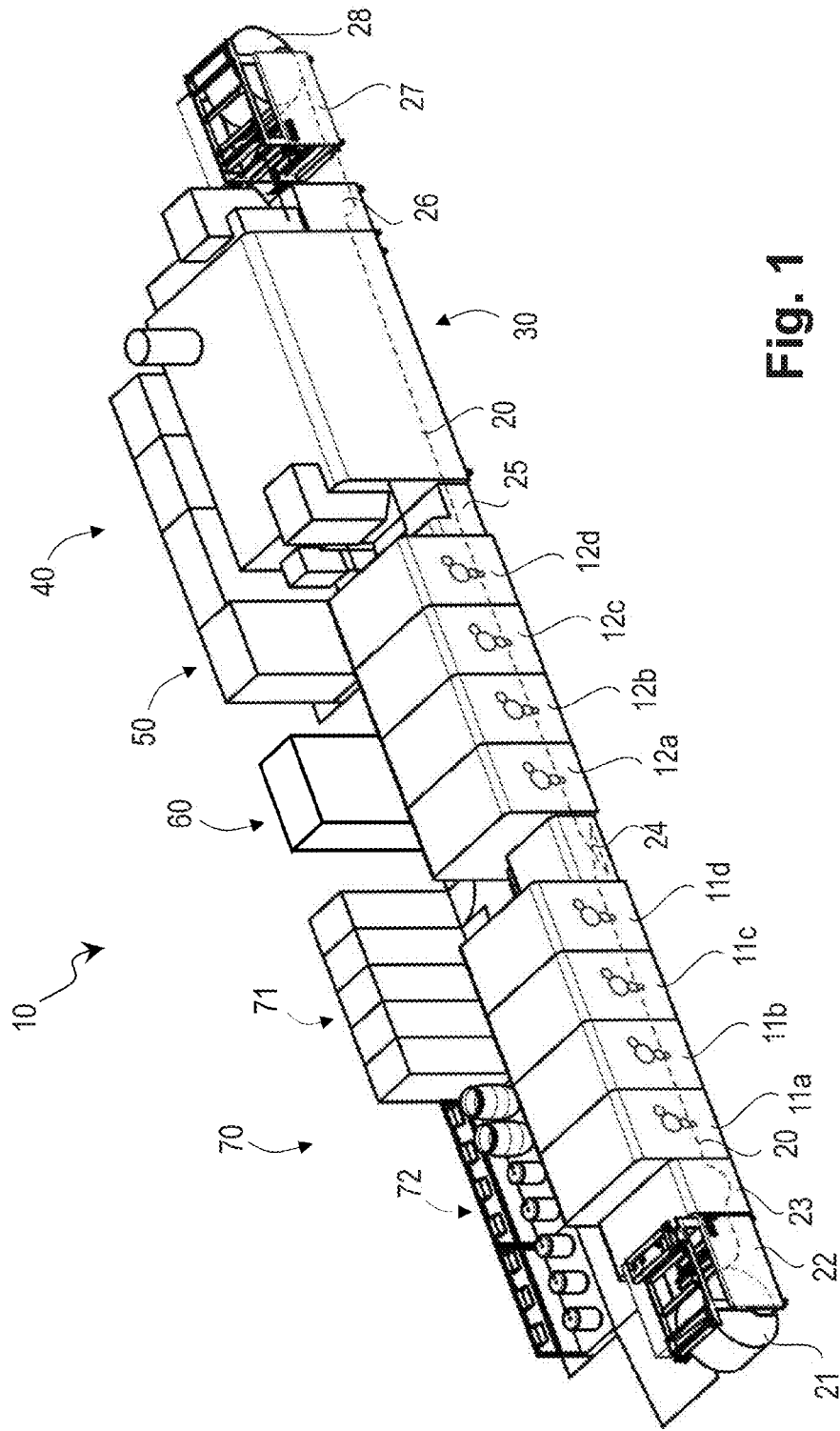
FIG. 1 illustrates a printing system using an example of a roll-to-roll configuration of a digital printer according to an exemplary embodiment of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the present disclosure is to reduce the number of stops of a printing system, the amount of spoilage linked with a stop, and the time loss linked with a stop. Furthermore, the present disclosure is directed to reduce the relative costs for the execution of print jobs that tend to result in small runs.

According to an exemplary embodiment, a method is described for the administration of print jobs which should be printed at a printing system. The method includes the determination of a plurality of print jobs, wherein a print job indicates a specification of one or more printing features, and wherein different specifications of a printing feature may require different configurations of the printing system. The method additionally includes the determination, on the basis of the one or more printing features of the plurality of print jobs, of change-over expenditures for the printing of at least two print jobs of the plurality of print jobs by the printing system. Moreover, the method includes the determination of an order for the printing of the plurality of print jobs on the basis of the change-over expenditures. Furthermore, the method includes the display of the order of the plurality of print jobs.

According to an exemplary embodiment, a print job administrator for a printing system is described. The print job administrator is configured to determine a plurality of print jobs, wherein a print job indicates a specification of one or more printing features, and wherein different specifications of a printing feature may require different configurations of the printing system. The print job administrator is additionally configured to determine, on the basis of the specifications of one or more printing features of the print jobs from the plurality of print jobs, change-over expenditures of the printing system for the printing of at least two print jobs of the plurality of print jobs by the printing system. Moreover, the print job administrator is configured to determine an order for the printing of the plurality of print jobs on the basis of the change-over expenditures. Furthermore, the print job administrator is configured to display the plurality of print jobs according to the determined order at an output module of the print job administrator.

According to an exemplary embodiment, an additional method for the administration of print jobs is described. The print jobs should thereby be printed at one or more printing systems. In an exemplary embodiment, the method includes the determination of a plurality of print jobs, wherein a print job indicates a specification of one or more printing features, and wherein different specifications of a printing feature may require different configurations of one of the one or more printing systems. In an exemplary embodiment, the method additionally includes the determination of an assignment function that is configured to assign a combination of specifications of the one or more printing features to a job group from a plurality of job from a plurality of job groups. Moreover, the method includes the assignment—using the assignment function—of the plurality of print jobs with a respective job group of the plurality of job groups. Furthermore, the method includes the inducement that a first print job of the plurality of print jobs is printed by a first printing system of the one or more printing systems depending on the assigned job group.

In an exemplary embodiment, a print job administrator for a printing system is can be configured to execute the aforementioned method for the administration of print jobs.

In an exemplary embodiment, a software (SW) program operable to be executed at a processor (for example at a computer/server) to thereby execute one of the methods according to exemplary embodiments of the present disclosure. In an exemplary embodiment, the SW is executed by processor circuitry of, for example, a computer/server. In an exemplary embodiment, the SW is executed by the print job administrator 200. In this example, the SW can be executed by processor circuitry of the print job administrator 200.

According to an additional aspect, a storage medium is described. The storage medium may include a SW program operable to be executed at a processor to thereby execute one of the methods according to exemplary embodiments of the present disclosure.

With reference to FIG. 1, a digital printer 10 for printing to a recording medium 20 has one or more print groups 11a-11d and 12a-12d that print a toner-based print image onto the recording medium 20. As shown, a web-shaped recording medium 20 (as a recording medium 20) is unrolled from a roll 21 with the aid of a take-off 22 and is supplied to the first print group 11a. The print image 20' is fixed on the recording medium 20 in a fixer 30. The recording medium 20 may subsequently be taken up on a roll 28 with the aid of a take-up 27. A configuration presented in FIG. 1 is also designated as a roll-to-roll printing system. Alternatively, the recording medium 20 may be divided up into individual sheets (not shown) by a cutter or sheet cutter at the output of the fixer 30.

FIG. 1 depicts a digital printer 10 based on the electrophotographic principle according to an exemplary embodiment of the present disclosure. It is noted that the aspects described in this document are also applicable to other types of digital printers 10 (for example other types of toner printers, ink printers and also to offset printers).

In the configuration depicted in FIG. 1, the web-shaped recording medium 20 is printed to in full color on the front side with four print groups 11a through 11d and on the back side with four print groups 12a through 12d (what is known as a 4/4 configuration). For this, the recording medium 20 is unwound from the roll 21 by the take-off 22 and is supplied via an optional conditioning group 23 to the first print group 11a. The recording medium 20 may be pretreated or coated with a suitable substance in the conditioning group 23. In embodiments, wax or chemically equivalent substances can be used as a coating substance (also designated as a primer).

The recording medium 20 is subsequently initially supplied to the first print groups 11a through 11d in order, in which print groups only the front side is printed to. Each print group 11a-11d typically prints to the recording medium 20 in a different color or even with different toner material, for example, Magnetic Ink Character Recognition (MICR) toner which can be read electromagnetically.

After printing to the front side, the recording medium 20 is turned in a turner 24 and supplied to additional print groups 12a-12d for printing to the back side. An additional conditioning group (not shown in FIG. 1) may be arranged in the region of the turner 24, via which conditioning group the recording medium 20 is prepared for printing to the back side. It is thus prevented that the front side print image is mechanically damaged by the subsequent print groups upon further transport.

Arranged after the print group 12d is a register 25 via which the register marks (which are printed on the recording medium 20 independently of the print image 20', in particular outside of the print image)) are evaluated. The transversal and longitudinal registration (the primary color dots that form a color dot should be arranged atop one another or spatially very close to one another; this is also designated as color registration or four-color registration) and the register (front side and back side must precisely spatially coincide) can therefore be adjusted so that a qualitatively good print image 20' is achieved.

Arranged after the register 25 is the fixer 30 via which the print image 20' on the recording medium 20 is fixed. Arranged after the fixer 30 is a drawing group 26 that draws the recording medium 20 through all print groups 11a-12d and the fixer 30 without an additional drive being arranged in this region. A friction drive for the recording medium 20 would create the risk that the as of yet unfixed print image 20' could be smeared.

The drawing group 26 supplies the recording medium 20 to the take-up 27 that rolls up the printed recording medium 20. Alternatively, the recording medium 20 may be cut into individual printed sheets by a sheet cutter.

Centrally arranged in the print groups 11, 12 and the fixer 30 are all supply devices for the digital printing 10, such as climate control fixer modules 40, power supply 50, controller 60, fluid management modules 70 (such as fluid controller 71 and reservoirs 72 of the different fluids). In particular, pure carrier fluid, highly concentrated liquid developer (higher proportion of toner particles in relation to the carrier fluid) and serum (liquid developer plus charge control substances) are required as fluids in order to supply the digital printer 10, as well as waste containers for the fluids to be disposed of or containers for cleaning fluid.

The recording medium 20 may be made of paper, paperboard, cardboard, metal, plastic and/or other suitable and printable materials.

Figure 2:
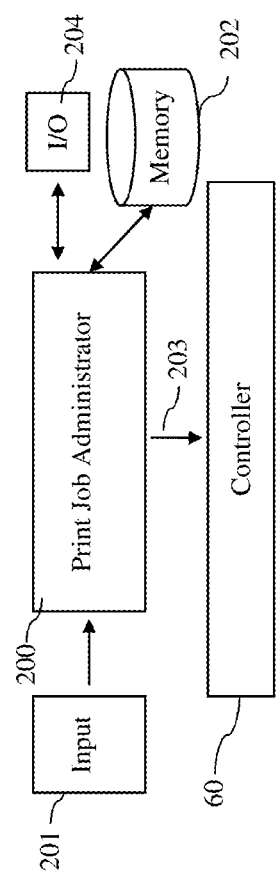
FIG. 2 illustrates components of a printing system according to exemplary embodiments of the present disclosure.

FIG. 2 shows examples of components of a printing system according to an exemplary embodiment of the present disclosure. The printing system can include a print job administrator 200 and the controller 60 of the digital printer 10. A printing system described in the present disclosure can include one or more digital printers 10 (for example, different digital printers 10 with different properties). Furthermore, the printing system described in the present disclosure can include one or more pre-stage modules that may implement a pre-processing of data of a print job. Moreover, a printing system may include one or more post-processing or finishing modules that may process (improve) a printed recording medium 20 following a digital printer 10. Examples of a post-processing module are a varnishing station, a cutting station, a binding station, a punching station etc. The printing system may additionally include at least one logistics system with which a storage and a shipping of a print job may be controlled. For example, different types of print jobs may require different logistical steps. A printing system may thus alternatively also be designated as a production system. Analogously, a print job may alternatively be designated as a production job. The print features describing a print job may alternatively also be designated as print product features or production features.

In an exemplary embodiment, the print job administrator 200 includes a printer driver that is configured to transfer a print job to the controller 60 of the digital printer 10. The print job may in particular include the print data 203 to be printed. Furthermore, print resources for the print job may be transmitted to the controller 60. The print resources and/or print data 203 may be stored in a memory 202 of the print job administrator 200. The print resources and/or print data 203 may be transferred to the controller 60 via an interface, for example an IPDS (Intelligent Printer Data Stream) interface.

In an exemplary embodiment, the print job administrator 200 is configured to administer one or more print jobs. In an exemplary embodiment, the print job administrator 200 includes processor circuitry configured to perform one or more functions and/or operations of the print administrator 200, including the administration of one or more print jobs. The one or more print jobs may be received via an input module 201. In an exemplary embodiment, the input module 201 is an input interface. The print job administrator 200 can be configured to associate the print jobs with different printing systems or digital printers 10. One or more requirements (e.g., print features) of the individual print jobs may thereby be considered, and for each print job, a corresponding printing system or a corresponding digital printer 10 may be selected via which the requirements of the print job may in principle be satisfied. For example, it may be ensured, via the association, that the required number of print groups 11, 12 for the required number of different colors in a printing system is available.

In an exemplary embodiment, the print job administrator 200 may additionally be configured to establish a sequence of print jobs at a printing system or digital printer 10, and to ensure that the sequence of print jobs may be printed by the digital printer 10 such that the recording medium 20 may be printed to optimally without halting the digital printer 10 and/or such that change-over times between print jobs are reduced (in particular minimized).

In an exemplary embodiment, when (e.g., immediately upon the completion of the printing) a print job has been printed on a recording medium 20, the print job may be marked as completed in the print job administrator 200 and, if applicable, may be accepted into a corresponding wait queue or list. The print job is then present as a physical printed recording medium 20. For example, the completed print job corresponds to one or more printed rolls 28 (or also only to a portion of a roll 28) and/or a plurality of printed sheets.

In an exemplary embodiment, the plurality of print jobs may be grouped in one or more wait queues. The one or more wait queues may have print jobs with the same or similar properties (i.e. with identical or similar print features). Examples of print features of a print job are:

properties of the recording medium 20 to be used (for example paper types, dimensions such as paper width); and/or properties of the digital printer 10 to be used (for example number of available colors, ink or toner, properties of varnishes used etc.) and/or requirements for a post-processing (for example cutting of sheets, punching, binding of sheets etc.).

Processing steps of a print job which take place "off line" with regard to a printer 10 (for example the finishing or gluing) may thus also be taken into account within the scope of a print feature (in particular of a print feature which relates to the post-processing). These production steps which take place "off line" may affect the sequence of the execution of print jobs. These production steps may possibly also take place at different sites.

In an exemplary embodiment, respective separate job wait queues may be administered by the job administrator 200 for specific combinations of print features. The job wait queues may be stored as lists of print job data sets in the memory 202 of the job administrator 200. For example, a plurality of job wait queues for a corresponding plurality of combinations of print features of the print jobs may be kept on hand by the job administrator 200. A print job may then be associated (for example using predefined rules) with a respective one of the plurality of predefined job wait queues. The print jobs may thus be grouped according to their properties. For the production of print jobs, the print jobs may be passed by the job administrator 200 from a job wait queue to the controller 60 of a printing system or digital printer 10. For example, for this the print jobs may be passed with a defined order into a production wait queue.

The different job wait queues (also designated as job groups in this document) may be formed according to different criteria. For example, print job data sets may be combined into a job wait queue, which print job data sets respectively have the same combination of print features;

do in fact have different combinations of print features, wherein these different combinations of print features may be realized at a printing system 10 solely via one or more software changes; and/or respectively should be printed at a specific printing system 10 of a plurality of differently configured printing systems 10.

In an exemplary embodiment, the grouping of print jobs into different job wait queues that may, if applicable, correspond to different printing systems may be implemented manually by a printing expert on the basis of experimental values. The printing expert may thereby consider the print features of a print job and assign the print job to a suitable job wait queue that enables an optimally efficient production of the print job.

In an exemplary embodiment, the rule system implicitly used by the printing expert may be reproduced via a machine learning method (e.g., via a neural network). For this purpose, training data with a plurality of training data sets may be formed from the manual assignments by a printing expert. A training data set $(x_i, y_i)$ thereby includes a combination of print features $x_i$ of a print job as well as the job wait queue $y_i$ to which the printing expert has assigned the print job.

The training data with the plurality of training data sets $(x_i, y_i)$, with $i=1, \ldots, N$, may then be used to train an assignment function (for example neurons, in particular pattern associators) of a neural network. The assignment function may be trained such that a specific mean degree of error (i.e. a mean cost function) is reduced (in particular minimized). The assignment function is then configured to automatically assign a new print job with a specific combination of features to a specific job wait queue. A grouping of print jobs via which an efficient execution of said print jobs is enabled may thus take place automatically. In particular, it is thus enabled to also cost-effectively print print jobs in a relatively small run.

Figure 3:
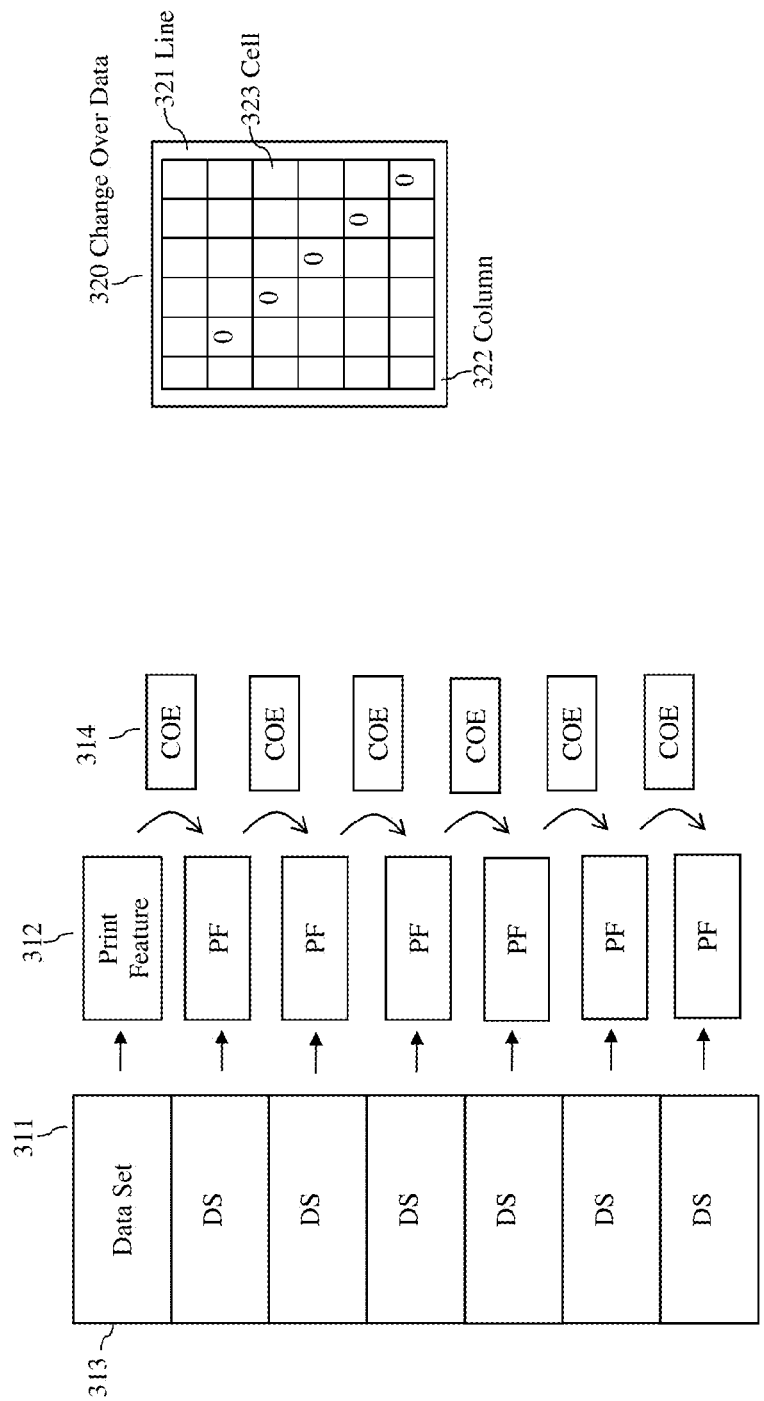
FIG. 3 illustrates examples of data for the administration of print jobs according to an exemplary embodiment of the present disclosure.

In an exemplary embodiment, the print job administrator 200 can be configured to administer one or more wait queues of print jobs. FIG. 3 shows an example wait queue 311 according to an exemplary embodiment. The wait queue 311 includes a plurality of print job data sets 313 that belong to a corresponding plurality of print jobs.

In an exemplary embodiment, a print job data set 313 includes a job ID (i.e. an identifier) for identification of a print job. The job ID may include a designator that uniquely identifies a specific print job data set 313 within a print job administrator 200. The identifier may include a combination of characters (for example letters, numbers, special characters etc.). Furthermore, the print job data set 313 includes the print data to be printed or a reference to a directory in memory 202 in which the print data of the print job are stored. Moreover, in an exemplary embodiment, the print job data set 313 may indicate the print features 312 (meaning the properties) of the print job.

In an exemplary embodiment, the print features 312 may be used by the print job administrator 200 to determine an order of the print jobs within the wait queue 311. In other words, the print jobs may be arranged in a wait queue 311 according to their print features 312. In particular, the print jobs may be arranged such that costs and/or time periods that are required for production of the print jobs are reduced (possibly minimized).

In an exemplary embodiment, as shown in FIG. 3, change-over expenditures 314 may be determined for the transitions from a first print job to a directly following second print job. For example, the change-over expenditures may include the change-over time that is required in order to change-over the printing system (for example a digital printer) 10 from the requirements of the first print job to the requirements of the second print job. The requirements of a print job at the printing system 10 may thereby be indicated by specifying the print features 312 of the print job. Alternatively or additionally, the change-over expenditures may include information (costs, for example) with regard to the spoilage that is created due to the transition from the first print job to the second print job.

In an exemplary embodiment, the change-over expenditures 314 may be determined based on change-over data 320. FIG. 3 shows an example of a table with change-over data 320. The table includes different lines 322 for a combination of specifications of print features 312 as a starting point of a change-over. The different lines 322 may thus reproduce different initial situations of a printing system 10. The different columns 321 of the table may reproduce combinations of specifications of print features 312 as a goal of a change-over. In other words, the different columns 321 may reflect different goal situations of a printing system 10. The lines 322 and the columns 321 in the table may possibly be swapped. The individual cells 323 of the table may thus indicate the change-over expenditures 314 for different combinations of initial situations and goal situations. The change-over data 320 may be predetermined and stored in the memory 202.

The print job administrator 200 may thus be configured to determine the cumulative change-over expenditures for a specific order of print jobs of a wait queue 311. Furthermore, the print job administrator 200 may be configured to modify the order of the print jobs such that the accumulated change-over expenditures are reduced (possibly minimized). The change-over data 320 may be used for this. Furthermore, iterative search methods may be used in order to determine an order of print jobs of a wait queue 311 that is as optimal as possible (with regard to the accumulated change-over expenditures).

Figure 4:
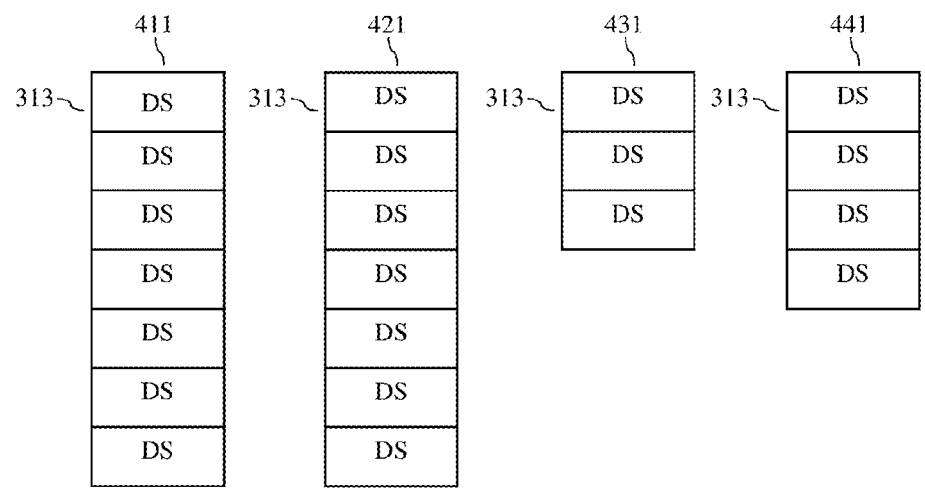
FIG. 4 illustrates wait queues according to an exemplary embodiment of the present disclosure.

FIG. 4 shows different wait queues 411, 421, 431, 441 for different statuses in the planning and production process of a print job according to an exemplary embodiment. A print job may have a specific status, for example:
the "Waiting" status if the print job is in planning, for example, and/or if the print job waits for the printing system 10 to satisfy the necessary print features 312;
the status "Clear for production" if the print job has been transmitted to the printing system 10 for printing;
the status "Intervention needed" if an error has occurred upon printing the print job; and/or
the status "Completed" if the print job has been printed successfully.

Different wait queues may be associated with the different statuses. For example, the "Waiting" status may be associated with the wait queue 411, the "Clear for production" status may be associated with the wait queue 421, the "Intervention needed" status may be associated with the wait queue 431, and the "Completed" status may be associated with the wait queue 441. The print jobs may then be assigned to a wait queue 411, 421, 431, 441 depending on their status. Furthermore, a specific position may be assigned to a print job (by means of the measures and/or processes described in this document) within each of these wait queues 411, 421, 431, 441 individually.

As has already been presented, the present disclosure is directed to simplifying the planning of the production of a plurality of print jobs and thereby in particular to effect a reduction of the costs or an increased throughput. For this purpose, two control elements are provided (and possibly linked with one another) for the administration of print jobs.

In an exemplary embodiment, a first control element is the position of a print job within a wait queue 311. In particular, the print job administrator 200 may be configured to enable a user (for example via a suitable input/output module 204) to establish an absolute job position for a print job within a wait queue. In particular, a user interface (for example a graphical user interface, GUI) and/or a programming interface (for example an application programming interface, API) may be provided which enable the order of a plurality of print jobs within a wait queue 311 to be established and modified. The position of a print job may define a first organization criterion for the administration of a plurality of print jobs.

In an exemplary embodiment, the print job administrator 200 may additionally be configured to determine and provide information with regard to change-over expenditures 314 for a specific arrangement of print jobs (for example via the input/output module 204). For example, the change-over expenditures 314 between print jobs of a wait queue 311 that are in direct succession may be determined by means of change-over data 320 and be indicated via a user interface of the print job administrator 200. Furthermore, the accumulated change-over expenditures of the print jobs of a sorted wait queue 311 may be determined and indicated. Moreover, an alternative order of the print jobs of a wait queue 311 may possibly be determined and indicated, via which a reduction of the accumulated change-over expenditures is enabled.

Furthermore, in an exemplary embodiment, as an additional control element, the print jobs may be subdivided into a plurality of classes. An additional organization criterion may be provided via the assignment to different classes. The ability to be associated with a class may be defined via specific features/statuses of the print job. For example, different classes may be for the statuses "Waiting" (for a specific property of the printing system 10, for example print medium, print colors, post-processing etc.), "Cleared for production," "User intervention required" or "Completed".

In particular, the print jobs in the "Waiting" class, which may be converted automatically or manually into the "Cleared for production" class at a specific point in time according to economic requirements, are hereby important to achieve a more efficient production order. In particular, the print jobs of the "Waiting" class (or of the wait queue 411) may be placed in an order via which the accumulated change-over expenditures are reduced (possibly minimized).

The print jobs from the "Waiting" wait queue may then be passed into the "Cleared for production" wait queue according to the determined order.

In an exemplary embodiment, the assignment of the print jobs to the corresponding classes/wait queues may already take place automatically upon importation of the print jobs into the print job administrator 200. However, the assignments to the classes/wait queues may also be changed dynamically in running operation as needed. For example, print jobs may change position within their class/wait queue. Alternatively or additionally, print jobs may change between classes/wait queues.

Furthermore, in an exemplary embodiment, the print jobs in the respective classes may be presented corresponding to their "production duration" and "print medium consumption" print features. In particular, the duration of the production of this print job may be determined for a print job of a wait queue 311 and be output via the user interface of the print job administrator 200.

The change-over of the printing system 10 may be reduced to a minimum required for production via the targeted pre-sorting of print jobs in the "Waiting" class. For example, print media changes may only take place due to refilling if additional print jobs with this production criteria are still present. Furthermore, a refilling may only take place upon changing print jobs, but not during the production of a print job.

Change-overs for economic reasons, corresponding to the requirements for the job completion (i.e. corresponding to the print features 312 of the pending print jobs), may be specifically planned via the measures presented in this document.

In particular, print jobs which are located in the "Waiting" or "Planning" status may be organized according to additional criteria (for example in different wait queues 311). These different groups or classes may be depicted at a user interface of the print job administrator 200 (for example in different wait queues 311).

In particular, the print jobs may be organized in order to reduce change-over expenditures 314 (for example setup times) of the printing system 10. For example, the classification of the plurality of print jobs according to colors used, according to the required number of print groups, according to the paper used, according to a finishing method used and according to a combination of these print features 312 is important in order to minimize the change-over expenditures 314. The print job administrator 200 may be configured to group or arrange in series a plurality of print jobs such that the accumulated change-over expenditures are reduced (possibly minimized). This may in particular take place in that print jobs with the same print features 312 (i.e. with the same specifications of one or more print features 312) are arranged in direct succession. Print jobs with the same specifications of one or more print features 312 may be merged into sub-groups. Moreover, these sub-groups of print jobs 312 with the same specifications of print features 312 may be arranged in series such that the change-over expenditures 314 between these respective sub-groups are reduced (possibly minimized).

Furthermore, one or more boundary conditions may also be taken into account in the determination of the order of print jobs. Examples of boundary conditions are:

the availability (for example the delivery time) of print materials (for example recording medium 20, colors etc.); for example, print jobs that require specific print materials are pushed back by the print job administrator 200 until these print materials are available;

the urgency/priority of a print job; and/or a defined completion point in time for a print job.

In an exemplary embodiment, the print job administrator 200 may enable a user to manually shift the position of a print job (relative to other print jobs in a wait queue 311). For example, a specific print job may be brought forward due to a new prioritization. The print job administrator 200 may then be configured to rearrange the remaining print jobs (starting from the repositioning of the specific print job) so that the accumulated change-over expenditures are reduced (possibly minimized). The aforementioned boundary conditions may thereby also be taken into account. The search for as optimal an order as possible may thereby take place via an iterative search method.

In particular, the print job administrator 200 may be configured to group print jobs. For this, print jobs with the same print features 312 may be identified first. From this, a plurality of sub-groups results with one or more print jobs with the same specifications of print features 312. Within each sub-group, the print jobs may be sorted according to their priority. Furthermore, it may be determined whether there is in a sub-group a print job for which an absolute completion point in time has been established. If this is the case, the corresponding sub-group may possibly be brought forward in order to be able to satisfy the completion point in time. Furthermore, a priority index between the sub-groups may be determined (for example on the basis of the priorities of the print jobs included in a sub-group).

The sub-groups may then be strung together according to the priority index. The accumulated change-over expenditures may be determined for this order. Starting from this situation, the accumulated change-over expenditures may be determined for additional permutations of the sub-groups (i.e. for different orders of the sub-groups) in order to determine as optimal an order as possible.

Figure 5:
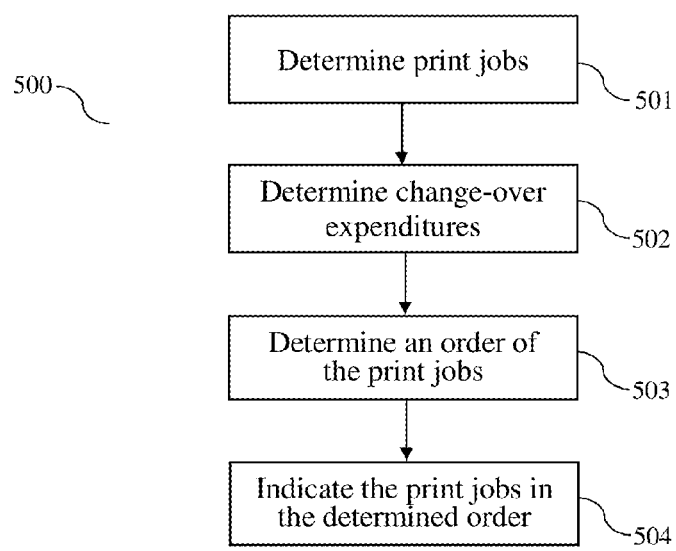
FIG. 5 illustrates a workflow diagram of a method for the administration of print jobs according to an exemplary embodiment of the present disclosure.

FIG. 5 shows a workflow diagram of an example of a method 500 for administration of print jobs which should be printed at a printing system 10 according to an exemplary embodiment. The method may be executed by a print job administrator 200 of the printing system 10.

The method 500 includes the provision or determination 501 of a plurality of print jobs. The plurality of print jobs typically includes a corresponding plurality of print job data sets 313. The plurality of print job data sets 313 may be stored in a memory 202 (for example in a database) of the print job administrator 200. A print job data set 313 may include a job ID of the print job. Furthermore, the print job data set 313 may include the print data of the print job that are to be printed, or a pointer to a directory of the memory 202 in which the print data are stored.

Furthermore, in an exemplary embodiment, a print job data set 313 of a print job may include information with regard to a specification of a print feature of a corresponding print job. A print job (or the corresponding print job data set 313) thereby typically indicates the specifications of a plurality of print features. A print feature of a print job may thereby have an influence on a required equipment of the printing system 10 used for the print job. In particular, different specifications of a print feature may require different configurations of the printing system 10. These different configurations of the printing system 10 may lead to change-over expenditures.

An example of a print feature is a type of a recording medium 20 to be used for a print job. Example specifications of this print feature are paper, a specific paper type, a material etc. An additional example of a print feature is a dimension of the recording medium 20 to be used for the print job. Examples of specifications of this print feature are A3 pages, A4 pages, sheets, rolls etc. An additional example of a print feature is a print color to be used for a print job. Examples of specifications of this print feature are different colors or color combinations, different color types etc. An additional example of a print feature is a varnish to be used for a print job, wherein different varnish types are considered as a specification. An additional example of a print feature is a post-processing of a printed recording medium 20 that is to be implemented for a print job. Examples of specifications of this print feature are the cutting of the printed recording medium 20 to size and/or the punching of the printed recording medium 20.

In an exemplary embodiment, the method additionally includes the determination 502 of change-over expenditures 314 for the printing (by the printing system 10) of at least two print jobs of the plurality of print jobs on the basis of the specification of the one or more print features 312 of said plurality of print jobs. In particular, the change-over expenditures 314 may be determined for the event that a specific second print job from the plurality of print jobs follows a specific first print job from the plurality of print jobs.

For example, the determination 502 of change-over expenditures 312 may include the determination of first specifications of one or more first print features 312 of the first print job as well as the determination of second specifications of one or more first print features 312 of the second print job. The one or more first print features 312 may thereby correspond to the one or more second print features 312. On the other hand, the specifications of the one or more print features 312 may differ from one another (at least for one of the print features 312).

Furthermore, in an exemplary embodiment, predetermined change-over data 320 may be provided. These change-over data 320 may be stored in a memory 202 of the print job administrator 200. The change-over data 320 may indicate change-over expenditures 314 for different combinations of specifications of one or more print features 312 before a change-over of the printing system 10 and, and for different combinations of specifications of one or more print features 312 after a change-over of the printing system 10. As presented above, the change-over data 320 may include a table with change-over expenditures for the different combinations of specifications of print features 312.

In an exemplary embodiment, the change-over expenditures 314 in the event that the second print job follows the first print job may then be determined on the basis of the first specifications of one or more first print features 312, on the basis of the second specifications of one or more second print features 312, and on the basis of the change-over data 320. In particular, the change-over data 320 arranged in a table may include a cell 323 with the change-over expenditures 314 for a change-over of the printing system 10 from a configuration for the first specifications of one or more first print features 312 to a configuration for the second specifications of one or more second print features 312.

In an exemplary embodiment, the change-over expenditures 314 for different arrangements of the print jobs may thus be determined from the plurality of print jobs. Furthermore, the accumulated change-over expenditures 314 for these different arrangements may be determined. The method 500 may thus additionally include the determination 503 for the printing of the plurality of print jobs on the basis of the change-over expenditures 314. The determination 503 of the order may thereby include the determination of accumulated change-over expenditures for the plurality of print jobs arranged in order. In particular, an order of the print jobs of the plurality of print jobs via which the accumulated change-over expenditures are reduced (possibly minimized)—for example in comparison to an initial arrangement of the print jobs—may thus be determined.

In an exemplary embodiment, the change-over expenditures may, for example, include or indicate a change-over time from a first configuration to a second configuration of the printing system 10. Alternatively or additionally, the change-over expenditures may include or indicate a quantity of spoilage which is created in the change-over from the first configuration of the printing system 10 to the second configuration of the printing system 10 (in particular due to a halting of the printing system 10 within the scope of the change-over). Alternatively or additionally, the change-over expenditures may include or indicate change-over costs for the change-over from the first configuration to the second configuration of the printing system 10.

In an exemplary embodiment, the method 500 may additionally include the display 504 of the order of the plurality of print jobs. For example, a list or a wait queue 311 in which the print jobs are arranged according to the determined order may be displayed. For example, the job IDs of the print jobs may be marked in a form sorted according to the determined order. The display of the order may take place via an output module 204 of the print job administrator 200. For example, a (graphical) user interface may be provided via the output module 204 and via an input module 204 of the print job administrator 200. The sorted print jobs may be displayed via the user interface. Furthermore, the sorted print jobs may be displayed via the user interface. Furthermore, the change-over expenditures 314 between individual print jobs and/or the accumulated change-over expenditures of the sorted plurality of print jobs may be indicated.

In an exemplary embodiment, the method 500 thus enables the user of a print job administrator 200 to sort print jobs efficiently such that expenditures for production of the plurality of print jobs may be reduced. In particular, change-over times and spoilage may be reduced.

In an exemplary embodiment, the determination 503 of the order of the print jobs of the plurality of print jobs may include the determination of similar print jobs of the plurality of print jobs, wherein similar print jobs typically have the same specification of one or more features 312. In particular, two print jobs may be considered to be similar if the two print jobs have specifications of print features 312 that cause no change-over expenditures 314 given a transition between the two print jobs. For example, sub-groups of one or more print jobs may be determined from the plurality of print jobs, wherein the one or more print jobs of a sub-group have the same specifications of print features, such that the one or more print jobs of a sub-group incur no change-over expenditures (apart from the provision of sufficient print materials). The order of the print jobs may then be determined such that the similar print jobs of a sub-group are arranged in direct succession. In other words, the print jobs of a sub-group may be arranged in groups within a list or wait queue 311. The change-over expenditures may thus be reduced (possibly minimized).

The determination of the order of the print jobs may thus include the determination of an order of the sub-groups of similar print jobs. In particular, the change-over expenditures may be determined between the sub-groups. An order may then be determined via which the accumulated change-over expenditures are reduced (possibly minimized).

In an exemplary embodiment, one or more boundary conditions may also be taken into account in the determination of the order of the print jobs from the plurality of print jobs. The one or more boundary conditions may lead to the situation that a specific print job from a plurality of print jobs must exhibit a specific position in the determined sequence of print jobs (for example due to a predetermined production point in time). The remaining print jobs from the plurality of print jobs may then be arranged between successive print jobs on the basis of the change-over expenditures 314. A sequence of print jobs via which accumulated change-over expenditures (i.e. the sum of the change-over expenditures) are reduced (possibly minimized) may thus also be determined under consideration of one or more boundary conditions.

In an exemplary embodiment, mathematical methods may be used to determine the order or the sequence of the print jobs, which mathematical methods are applied to (for example) solve the Traveling Salesman Problem. For this, the sub-groups of similar print jobs may initially be determined as preparation. These sub-groups may then be considered as nodes of a graph. The edges between these nodes may be associated with costs (or with a length) that correspond to the respective change-over expenditures 314 between the sub-groups. A sequence of print jobs via which the accumulated change-over expenditures (analogous to the total travel distance of the traveling salesman) are reduced (possibly minimized) may then be determined using solution methods, for example linear optimization.

The sequence of print jobs may be relayed to the printing system 10 (for example to a controller 60 of the printing system 10) according to the determined order for printing. For example, the sequence of print jobs (and the print job data sets 313 that belong to these) may be transferred into a production wait queue 421 according to the determined order.

Figure 6:
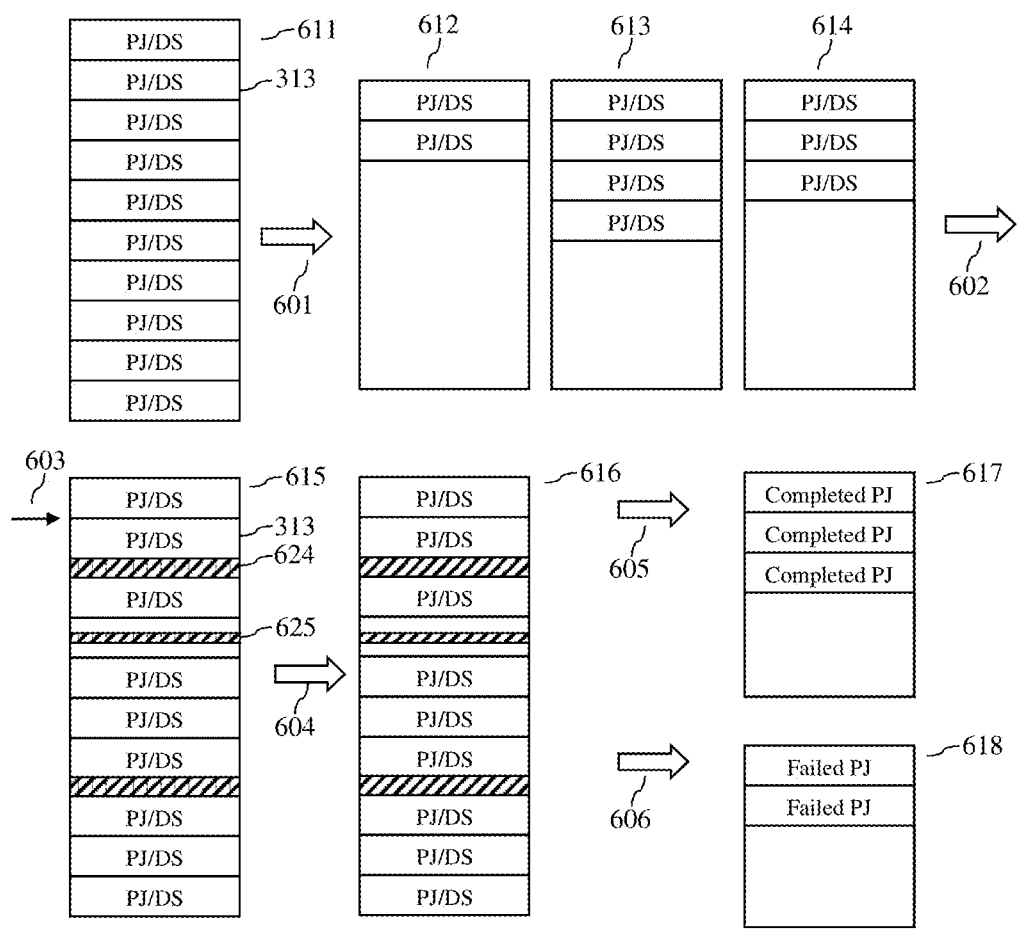
FIG. 6 illustrates a sequence of lists for the administration of print jobs according to an exemplary embodiment of the present disclosure.

FIG. 6 illustrates an example of a method 500 for the administration of print jobs according to an exemplary embodiment. The lists/wait queues depicted in FIG. 6 may, if applicable, be displayed at an output module 204 of the print job administrator 200 and be edited manually by a user.

In an exemplary embodiment, in the print job administrator 200, a plurality of print jobs or print job data sets 303 may be incorporated into an input list or into an input wait queue 611. The print jobs may be received from different sources. The print jobs or the print job data sets 303 may be arranged in the input list 611 in chronological order (according to the input of the print jobs), for example.

In an exemplary embodiment, the print jobs in the input list 611 may be automatically arranged in a plurality of grouped lists 612, 613, 614 on the basis of the specification of one or more print features 312 of the print jobs. For example, the print jobs may be assigned to the individual grouped lists 612, 613, 614 depending on the required paper size. The grouped lists 612, 613, 614 may be converted into a production planning list 615 (possibly at the request of a user of the print job administrator 200) (step 602). For this, the groups of print jobs from the grouped lists 612, 613, 614 may be placed in a series such that accumulated change-over expenditures 314 for the determined production planning list 615 are reduced (possibly minimized). Furthermore, boundary conditions (for example the priority of a print job) may be taken into account in the determination 602 of the production planning list 615.

In the example depicted in FIG. 6, the print jobs of a first grouped list 612 are arranged before the print jobs of a second grouped list 613, and these are in turn arranged before the print jobs of a third grouped list 614 in the production planning list 615. Furthermore, the change-over expenditures 624 between the print jobs or between the groups of print jobs may be determined and possibly may be output/indicated. Moreover, it may be determined and indicated whether additional equipment expenditures 625 result between the print jobs (for example because it is expected that a new paper roll is to be introduced during a print job).

In an exemplary embodiment, the output/input module 204 of the print job administrator 200 may enable a user to manually arrange the print jobs or print job data sets 313 listed in the production planning list 615 (step 303). This may take place via a "drag-and-drop" mechanism, for example. For example, a prioritized print job may be delayed and/or the order of the print jobs within a group of print jobs may be manually modified.

In an exemplary embodiment, the production planning list 615 that is created automatically (and possibly manually) may subsequently be converted (for example in reaction to an input of a user of the print job administrator 200) into a production list 616) (step 604), and the printing of the print jobs may therefore be initiated. In the event of an execution of a print job by the printing system 10 without problems, the print job may be assigned to a list 617 of completed print jobs (step 605) and may possibly be indicated. Given the presence of an error in the execution of the print job, the print job may be assigned to a list 618 of failed print jobs (step 606) and may possibly be indicated.

The lists depicted in FIG. 6 may be reviewed and possibly modified by a user via a graphical user interface of the print job administrator 200. A time-/cost-optimized execution of a plurality of print jobs may be achieved via the automatic creation of a production planning list 615 (possibly via the intermediate step of the grouping of the print jobs into grouped lists 612, 613, 614). Furthermore, via the possibility of a manual changing of the order of print jobs (for example in the production planning list 615) the user receives sufficient flexibility in order to be able to react to acute boundary conditions (for example to an acute prioritization of a print job).

The print job administrator 200 may thus be configured to determine a plurality of print jobs. A print job thereby shows a specification of one or more print features 312. Different specifications of a print feature may thereby require different configurations of the printing system 10, and thus incur change-over expenditures 314.

In an exemplary embodiment, the print job administrator 200 may be configured to determine change-over expenditures 314 of the printing system 10 for the printing of at least two print jobs of the plurality of print jobs on the basis of the specifications of one or more print features 312 of the print jobs from the plurality of print jobs. In particular, accumulated change-over expenditures may be determined for different orders of the print jobs of the plurality of print jobs. An order for the printing of the plurality of print jobs (for example the order with the minimum accumulated change-over expenditures) may then be determined on the basis of the change-over expenditures 314.

In an exemplary embodiment, the print job administrator 200 may additionally be configured to indicate the plurality of print jobs at an output module 204 (for example on a monitor) of the print job administrator 200 according to the determined order. For example, the print job administrator 200 may be configured to arrange the plurality of print jobs in a wait queue 311 according to the determined order (for example in a planning wait queue or in a wait queue for print jobs with the "Waiting" status). The wait queue 311 with the plurality of print jobs (for example the wait queue 311 with job IDs of the plurality of print jobs) may be indicated at the output module 204.

In an exemplary embodiment, the print job administrator 200 may additionally be configured to detect a change of a position of a first print job within the list or wait queue 311 via an input module 204 of the print job administrator 200 (for example via a touch-sensitive screen, for example a keyboard and/or by means of a mouse). For example, it may be made possible for a user to place a first print job at a different position within the displayed list or wait queue 311 by means of "drag-and-drop". The first print job may then be indicated at the modified position in the wait queue 311 at the output module 204.

Furthermore, the print job administrator 200 may be configured to determine a modified order for the printing of the other print jobs of the plurality of print jobs (and possibly display this via the output module 204) on the basis of the change-over expenditures 314 (in particular on the basis of change-over data 320). The plurality of print jobs in the wait queue 311 may then be indicated at the output module 204 according to the modified order. A user of the print job administrator 200 may thus efficiently plan the production of a plurality of print jobs.

As was already presented above, the print job administrator 200 may include a memory 202 that is configured to store change-over data 320 that indicate change-over expenditures 314 for different combinations of specifications of one or more print features 312 before a change-over of the printing system 10 and for different combinations of specifications of one or more print features 312 after a change-over of the printing system 10. The provision of change-over data 320 enables the print job administrator 200 to determine the order of a plurality of print jobs automatically (possibly without intervention of a user), and thus to reduce (possibly to minimize) accumulated change-over expenditures.

In an exemplary embodiment, the print job administrator 200 may additionally be configured to assign print jobs to different classes. The different classes may thereby indicate different processing states of the print jobs. Examples of processing states are, for example, the "Waiting" status, the "Cleared for production" status, the "Intervention needed" status and/or the "Completed" status. The different classes with the assigned print jobs may be indicated via the output module 204 of the print job administrator 200 (for example in different lists or wait queues 411, 421, 431, 441). The user of the print job administrator 200 may thus efficiently arrange different print jobs according to the processing state and efficiently produce a change of the processing state by shifting between the lists/wait queues 411, 421, 431, 441 (for example, initiate the production of a print job by shifting a print job into the list/wait queue 421 for the "Cleared for production" status).

Figure 7:
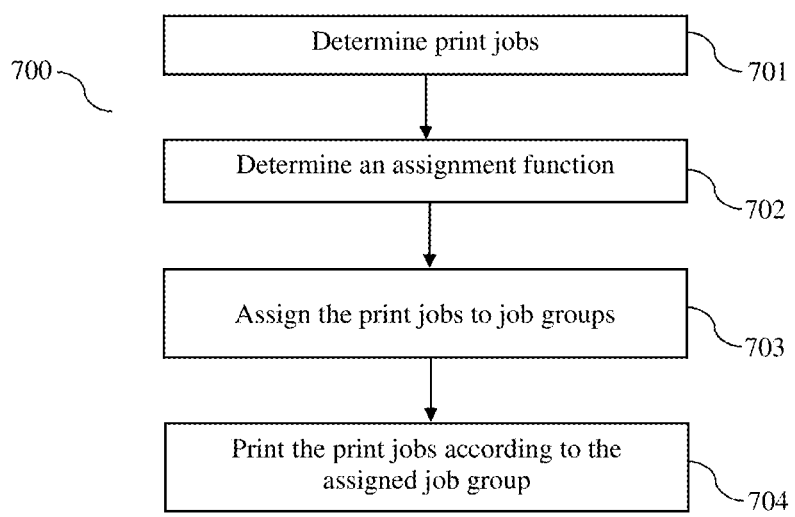
FIG. 7 illustrates a workflow diagram of a method for the administration of print jobs according to an exemplary embodiment of the present disclosure.

As presented in connection with FIG. 2, a grouping of the print jobs into different job wait queues or job groups may be made in preparation for the printing of the print jobs at the printing system 10. In particular, print jobs with the same or similar requirements may be grouped in order to reduce (to minimize, if possible) accumulated change-over expenditures in the execution of the print jobs. FIG. 7 shows a workflow diagram of an example of a method 700 for the administration of print jobs which should be printed at one or more printing systems 10 according to an exemplary embodiment.

In an exemplary embodiment, the method 700 may be executed via the print job administrator 200. In an exemplary embodiment, the method 700 may be executed in combination with the method 500. For example, the method 700 may initially be used in order to group a plurality of print jobs into different job groups (also designated as job wait queues in this document). Furthermore, the method 500 may be used in order to determine an (optimal) order of the print jobs of a job group. Accumulated change-over expenditures for the printing of a plurality of print jobs may thus be additionally reduced via the combination of the methods 700 and 500. In particular, it is thus enabled to also print the print jobs with relatively small runs cost-effectively.

In an exemplary embodiment, the method 700 includes the determination 701 of a plurality of print jobs. A print job thereby indicates a specification of one or more print features 312, wherein different specifications of a print feature may require different configurations of one of the one or more printing systems 10. Examples of print features 312 are: a type of recording medium 20 (for example paper, cardboard, film) to be used for a print job; a dimension—in particular a width—of the recording medium 20; a print color to be used for a print job; a varnish to be used for a print job; a duration or a run of the print job; a requirement with regard to a point in time for completion of the print job; and/or a post-processing to be implemented for a print job, in particular varnishing, cutting and/or punching of a printed recording medium 20.

Furthermore, in an exemplary embodiment, the method 700 includes the determination 702 of an assignment function that is configured to assign a combination of specifications of the one or more print features 312 of a job group from a plurality of job groups. The different job groups may thereby correspond to respective similar configurations of a printing system 10. In particular, the assignment function may be designed such that a job group of the plurality of job groups includes print jobs that may be printed at a printing system 10 without changing the configuration. Alternatively or additionally, the assignment function may be designed such that a job group of the plurality of job groups includes print jobs that require only one or multiple software changes to the configuration of the printing system 10. Alternatively or additionally, the assignment function may be designed such that a job group of the plurality of job groups includes print jobs that may be printed by the first printing system 10 with change-over expenditures 314 that are the same as or less than a predefined expenditure threshold.

In an exemplary embodiment, the assignment function may thus be configured to sort the print jobs into different job groups so that the print jobs from one job group may be printed at a printing system 10 with limited change-over expenditures 314 (possibly without change-over expenditures 314). For example, M different printing systems 10 (with M>1) are provided, wherein the M printing systems 10 have 10 respective different configurations. The plurality of job groups may then include M job groups for the corresponding M printing systems. The print jobs may thus be assigned to the differently configured printing systems 10 automatically via the assignment function in order to reduce the accumulated change-over expenditures for the printing of the print jobs.

In an exemplary embodiment, the configuration of a printing system 10 may be determined via one or more of the following parameters: a number of available print groups 11, 12 of the printing system 10; a type of recording medium 20, in particular paper, film etc. that may be printed to by the printing system 10; a grammage or thickness of the recording medium 20 that may be printed to by the printing system 10; dimensions—in particular a width—of a recording medium 20 that may be printed to by the printing system 10; an availability of duplex printing; one or more print colors that may be printed by the printing system 10; one or more post-processing steps—in particular varnishing, longitudinal cutting; transversal cutting and/or punching—that may be provided by the printing system 10; and/or one or more pre-processing steps—in particular application of a primer—that may be provided by the printing system 10.

In an exemplary embodiment, the method 700 additionally includes the assignment 703 (using the assignment function) of the plurality of print jobs with a respective job group of the plurality of job groups. Moreover, the method 700 may include the inducement 704 (for example via transmission of print data to the controller 60 of a printing system 10) that a first print job of the plurality of print jobs is printed by a first printing system 10 of the one or more printing systems 10 depending on the assigned job group. For example, a specific printing system 10 may be assigned to each job group. The print jobs of one job group may then be printed by the respective assigned printing system 10.

In an exemplary embodiment, the method 700 thus enables even print jobs with relatively small runs to be printed efficiently. In particular, the (manual) expenditure for the assignment of print jobs to printing systems 10 or for the arrangement of print jobs in a wait queue 411 of a printing system 10 may be reduced or completely avoided via the use of a predefined assignment function.

In an exemplary embodiment, the assignment function may indicate machine-learned patterns given the manual assignment of print jobs with job groups. In particular, the assignment function may indicate machine-learned knowledge about how a printing expert manually assigns print jobs to the different job groups. The knowledge of the printing expert may thereby be reproduced by training data.

The assignment function is typically educated using such training data, wherein the training data include a plurality of training data sets. A specific training data set of the training data thereby indicates a specific print job with a specific combination of specifications or values of the one or more print features and a correspondingly defined job group, wherein the association of the specific print job with the specific job group has been performed manually (by a printing expert).

The knowledge of a printing expert is thus reproduced statistically by the training data. This knowledge may be transferred via suitable machine learning methods to an assignment function, which then may be used for the automatic assignment of print jobs with job groups. Examples of assignment functions are: a classifier with the plurality of job groups as different classes and with the one or more print features as a feature vector; a neural network that in particular has pattern associators; and/or a support vector machine.

The minimization of a cost function typically takes place in the training of an assignment function. The assignment function may thus be configured to assign the first print job to a first job group such that a predefined cost function is statistically reduced (in particular minimized). The cost function may thereby depend on change-over expenditures of the first printing system for the printing of the first print job. In other words: the assignment function may be trained with the training data such that the assignment function is configured to statistically (for the training data) reduce (possibly minimize) the accumulated change-over expenditures for the printing of a plurality of print jobs.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily refer-ring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, processor circuitry can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 10 printing system, in particular digital printer
11, 11a-11d print group (front side)
12, 12a-12d print group (back side)
20 recording medium
21 roll (input)
22 take-off
23 conditioning group
24 turner
25 register
26 drawing group
27 take-up
28 roll (output)
30 fixer
40 climate control module
50 power supply
60 controller
70 fluid management
71 fluid controller
72 reservoir
200 print job administrator
201 input module
202 memory of the print job administrator
203 print data/resources
204 input and/or output module
311 list/wait queue
312 print features
313 print job data set
314 change-over expenditures
320 change-over data
321 line of a change-over expenditure table
322 column of a change-over expenditure table
323 cell of a change-over expenditure table
411, 421, 431, 441 lists/wait queues for different classes
500 method for administering print jobs
501, 502, 503, 504 method steps
601 grouping of print jobs
602 creation of a production planning list
603 changing the production planning list
604 transfer to production
605, 606 execution of the print jobs, possibly with errors
611 input list/wait queue with print jobs
612, 613, 614 grouped lists/wait queues
615 production planning list/wait queue
616 production list/wait queue
617 list/wait queue of the completed print jobs
618 list/wait queue of the print jobs with errors
624 change-over expenditures
625 equipment expenditures
700 method for administering print jobs
701, 702, 703, 704 method steps

What is claimed is:

1. A method for administration of print jobs to be printed at one or more printing systems, the method being executed by a print job administrator, wherein the method comprises:
analyzing one or more manual assignments of print jobs into job groups, the manual assignments being based on respective one or more print features associated with the job groups, wherein a print job of the print jobs indicates a specification of the one or more print features, wherein different specifications of a print feature of the one or more print features may require different configurations of one of the one or more printing systems;
generating a respective training data set for each of the analyzed manual assignments based on the analysis of the manual assignments, each of the training data sets including an association of the one or more print features with a respective one of the job groups;
analyzing the training data sets to determine machine-learned patterns of the manual assignments;
determining an assignment function based on the determined patterns, the assignment function being configured to assign a combination of specifications of the one or more print features of a print job to one of the job groups;
assigning, using the assignment function, a first print job with a respective one of the job groups; and
inducing the first print job to be printed by a first printing system of the one or more printing systems depending on the assigned job group.

2. The method according to claim 1, wherein:
the assignment function is configured to assign the first print job to a first job group such that a predefined cost function is statistically reduced; and
the cost function depends on change-over expenditures of at least one of: the first printing system for the printing and the processing of the first print job.

3. The method according to claim 1, wherein the assignment function comprises at least one of:
a classifier with the job groups as different classes and with the one or more print features as a feature vector;
a neural network that in particular has pattern associators; and
a support vector machine.

4. The method according to claim 1, wherein a job group of the job groups comprises at least one of:
print jobs that may be printed at a printing system without changing the configuration;
print jobs that require only one or multiple software changes to the configuration of a printing system; and
print jobs that may be printed by the first printing system with change-over expenditures that are equal to or less than a predefined expenditure threshold.

5. The method according to claim 1, wherein:
the print jobs are printable at a respective printing system of M printing systems, with M>1;
the M printing systems have different configurations; and
the plurality of job groups includes M job groups for the corresponding M printing systems.

6. The method according to claim 1, wherein the configuration of a printing system comprises at least one of:
a number of available print groups;
a type of recording medium that may be printed to by the printing system;
a grammage or thickness of a recording medium that may be printed to by the printing system;

one or more dimensions of the recording medium that may be printed to by the printing system;
an availability of duplex printing;
one or more print colors that may be printed by the printing system;
one or more post-processing steps that may be produced by the printing system; and
one or more pre-processing steps that may be produced by the printing system.

7. The method according to claim 2, wherein the change-over expenditures comprise at least one of:
a change-over time from a first configuration to a second configuration of the printing system;
a quantity of spoilage which is created in a change-over from the first configuration to the second configuration of the printing system; and
change-over costs for the change-over from the first configuration to the second configuration of the printing system.

8. The method according to claim 1, wherein the print features comprise at least one of:
a type of recording medium to be used for a print job;
a dimension of the recording medium;
a print color to be used for the print job;
a varnish that is to be used for the print job;
a duration of the print job;
a completion time requirement of the print job; and
a post-processing of a printed recording medium that is to be implemented for the print job.

9. The method according to claim 1, wherein the assignment function comprises:
a classifier with the job groups as different classes and with the one or more print features as a feature vector;
a neural network having pattern associators; and
a support vector machine.

10. A print job administrator for a printing system, the print job administrator being configured to:
analyze one or more manual assignments of print jobs into job groups, the manual assignments being based on respective one or more print features associated with the job groups, wherein a print job of the print jobs indicates a specification of the one or more print features, wherein different specifications of a print feature of the one or more print features may require different configurations of one of one or more printing systems;
generate a respective training data set for each of the analyzed manual assignments based on the analysis of the manual assignments, each of the training data sets including an association of the one or more print features with a respective one of the job groups;
analyze the training data sets to determine machine-learned patterns of the manual assignments;
determine an assignment function based on the determined patterns, the assignment function being configured to assign a combination of specifications of the one or more print features of a print job to one of the job groups;
assign, using the assignment function, a first print job to a respective one of the job groups; and
induce the first print job to be printed by a first printing system of the one or more printing systems depending on the assigned job group.

\* \* \* \* \*